Aug. 10, 1943.   C. E. HILL   2,326,645
FISHING REEL
Filed June 15, 1940
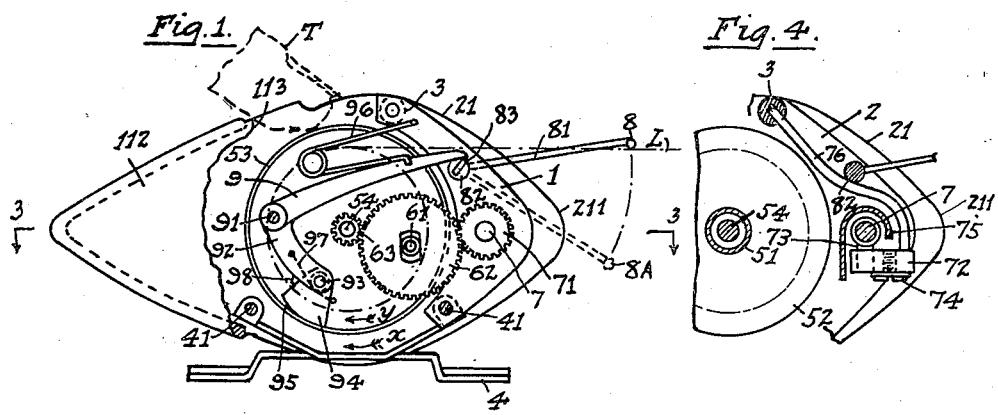
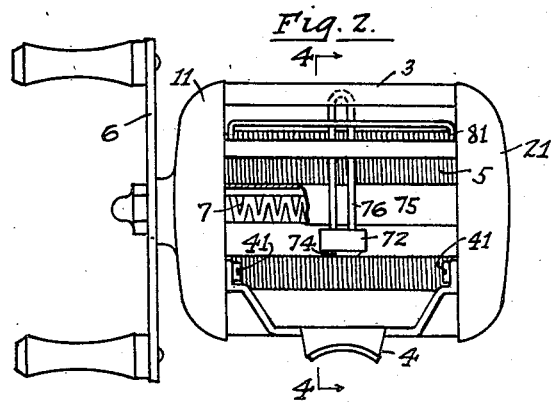
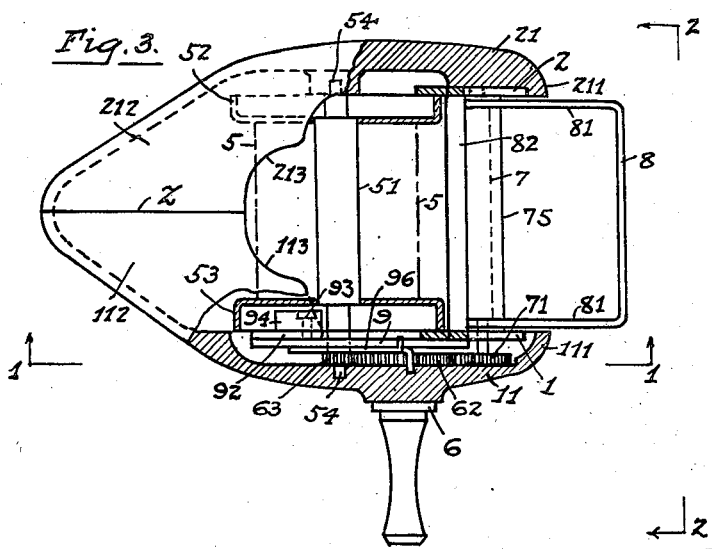
Inventor –
Carson E. Hill Patented Aug. 10, 1943

2,326,645

UNITED STATES PATENT OFFICE 2,326,645

FISHING REEL

Carson E. Hill, Ferndale, Mich.

Application June 15, 1940, Serial No. 340,832

1 Claim. (Cl. 242—84.5)

My invention relates to fishing reels more particularly of the anti-backlash type and its principal object is to provide an anti-backlash mechanism which is simple in construction and at the same time more effective in operation under all conditions of service than is the case with such mechanisms as at present employed. In reels of conventional construction the line passes from the spool through a guide which reciprocates in a direction parallel to the axis of the spool and causes the line to be laid in a smooth and even manner. Thence the line passes under a bail positioned in front of the guide and journaled in the frame of the reel, the said bail being arranged in co-operative relation with a spring-actuated braking device in such manner that when the line is slack the brake effects a retarding action upon the spool, but when the line is rendered taut so as to raise the bail the braking device is rendered inoperative, allowing the spool to rotate freely. Reels of this type have in general the disadvantage that, due to wear of the braking device, it is necessary to provide means for manually adjusting the same but, since considerable skill is necessary in making such adjustment, the results are frequently unsatisfactory and the efficiency of the reel is impaired. Further, it is found that, due to the difference in the way the reel is held by certain operators, it is possible to have the brake dragging on the spool when winding in the line so that this operation is very difficult owing to the high speed of the spool in relation to that of the crank.

It is an object of the present invention to provide a brake mechanism which is uni-directional in operation, being designed to retard the movement of the spool in the paying-out direction and to be entirely free of the spool when taking in the line.

It is a further object of the said invention to provide a brake mechanism in which adjustment for wear is made automatically, so that the retarding force upon the spool is rendered constant during the life of the reel and the difficulties resulting from incompetent manual adjustment of and tampering with the mechanism is avoided.

Still another object is to provide a spool the outer body of which is of stream-lined shape, making it much smoother and more convenient to handle, and which is better adapted for "thumbing" or manual retardation of the spool which, notwithstanding the provision of automatic braking mechanism as above recited, is still necessary in certain cases, notably during the back stroke before making the cast.

With these and other objects in view, I will now describe a preferred embodiment of my said invention with reference to the accompanying drawing, in which—

Figure 1 is a vertical longitudinal section taken on line 1—1 of Figure 3, the front head being removed.

Figure 2 is an end elevation taken on line 2—2 of Figure 3.

Figure 3 is a sectional plan view taken on line 3—3 of Figure 1, in general, certain parts being shown in elevation, and Figure 4 is a fragmentary longitudinal section corresponding to Figure 1 but taken on line 4—4 of Figure 2.

Like characters designate corresponding parts throughout the several views.

The main frame of the reel, which supports the various moving parts, comprises two heads or end plates 1, 2 which are arranged vertically and spaced apart horizontally at their upper portions by the pillar 3 and at their lower portions by the saddle 4 by which the reel is attached to the fishing rod, to which they are connected by the screws 41. Externally of the plates 1, 2 are the outer heads 11, 21 which are secured together in spaced relation by the same means as the plates 1 and 2. These outer heads are preferably formed from plastic material and designed with a purpose to be hereinafter explained. Between the head plates 1, 2 is arranged a spool 5 which has a hub 51 of small diameter and end flanges 52, 53 of large diameter for retaining the line on the spool. The hub 51 is mounted upon a shaft 54 which is journaled at its opposed ends in bearings formed in the outer heads 11, 21. Manual rotation of the reel is effected by means of the crank 6 carried upon a short shaft 61 journaled in the head 11 to which shaft is secured a gear 62 meshing with a pinion 63 on the adjacent end of the shaft 54.

Line-laying means, for causing the line to be distributed evenly upon the hub of the spool, comprises a right and left hand screw 7 journaled in the plates 1, 2 and provided with a pinion 71 which meshes with the driving gear 62 so that rotation of the crank 6 causes reciprocation of a carriage 72 carried upon the screw 7, the said carriage having a pawl 73 pivoted in the carriage and retained in position by the screw 74, the said pawl engaging the threads of the screw in the well known manner. A guard 75, preferably formed of sheet metal, protects the screw from entanglement with the line when the latter is hanging loosely. Secured to the carriage 72 is a U-shaped line guide 76, the upper end of which is guided in a groove in the pillar 3. The line, L, passing outwardly from the spool, extends between the members of the U-shaped guide 76 and then passes beneath the transverse member 8 of the bail, the said bail having arms 81 secured to a rock-shaft 82 rotatably held in bearings in the plates 1 and 2. The rock-shaft 82, where it projects through the plate 1, is provided with a short transverse lever 83, and in cooperative relation with this lever is the main brake lever 9 pivoted at 91 to the head 11. The brake lever 9 has an arm 92 to the end of which is pivoted as at 93 a brake shoe 94, of asbestos fiber or other suitable material. The arrangement of the parts just described is such that the brake shoe 94 extends into the flange 53 of the spool and is adapted, under certain conditions to be hereinafter explained, to frictionally engage the inner periphery of the said flange. Above the brake lever 9 is positioned a spring 96 which presses constantly downwards upon the same, tending to apply the brake when the bail 8 is in the lower dotted position designated 8A in Figure 1. When, however, the bail is raised to the upper full line position, the short lever 83 impinges upon the brake lever so as to raise the same and relieve the brake. The brake shoe 94 is formed with an arcuate surface 95 which is eccentric to the coacting surface within the flange 53 against which it is pressed lightly by a spring 97 urging it in the direction of the arrow y in Figure 1, so that when the spool is rotated in the direction of the arrow x a braking action is obtained, while when the spool rotates in the opposite direction the brake shoe swings backwards and bears upon the flange with only an infinitesimal pressure merely sufficient to prevent accidental movement of the spool during handling of the heel. A stop 98 limits the movement of the shoe while movement of the lever 9 is, of course, limited by the position of the lever 83 in the rock-shaft 82.

The heads 11, 21 have their front portions rounded as indicated at 111, 211 while their rear ends have horizontal flanges 112, 212 which meet together upon the center line of the reel, as indicated at z in Figure 3. These flanges at their front ends are of arcuate form as indicated at 113, 213 so as to provide a space for receiving the thumb T (Figure 1) of the operator at such times as thumbing of the reel is desirable, as previously explained. In this manner a smooth thumb rest is provided which very much reduces the fatigue of the thumbing operation, while the general design of the heads presents a smooth exterior of the reel as a whole which is far more convenient for handling than the plain metal heads and other parts having sharp edges which exist in conventional designs.

It will be observed from the foregoing description and by reference to the drawing that I have provided a reel which is simple in construction and at the same time fulfills the conditions laid down in the preamble hereof, and while I have herein described and shown a preferred embodiment of my invention it will be readily understood by those skilled in the art to which the same pertains that various modifications in detail may be made to suit any particular or peculiar requirements without departing from the spirit of my invention as defined in the appended claim.

Having thus described my said invention, what I claim and desire to secure by Letters Patent of the United States is:

A fishing reel comprising a frame, a spool rotatably mounted upon said frame, a line wound upon said spool, a bell-crank lever pivoted upon said frame having pivoted upon one arm a brake shoe adapted to frictionally engage said spool, said shoe having a surface arranged eccentrically in relation to the co-acting surface upon said spool so as to engage the same more intensely in one direction than in the other, spring means yieldingly urging said shoe against said spool, an oscillatable bail member responsive to variations in the tension of the line, and crank means upon said bail member adapted to engage the other arm of said lever and to release the braking action when said line is tensioned.

CARSON E. HITT